March 7, 1933.  W. J. DEAN  1,899,947
BEAD FORMING MACHINE
Filed Dec. 6, 1930   2 Sheets-Sheet 1
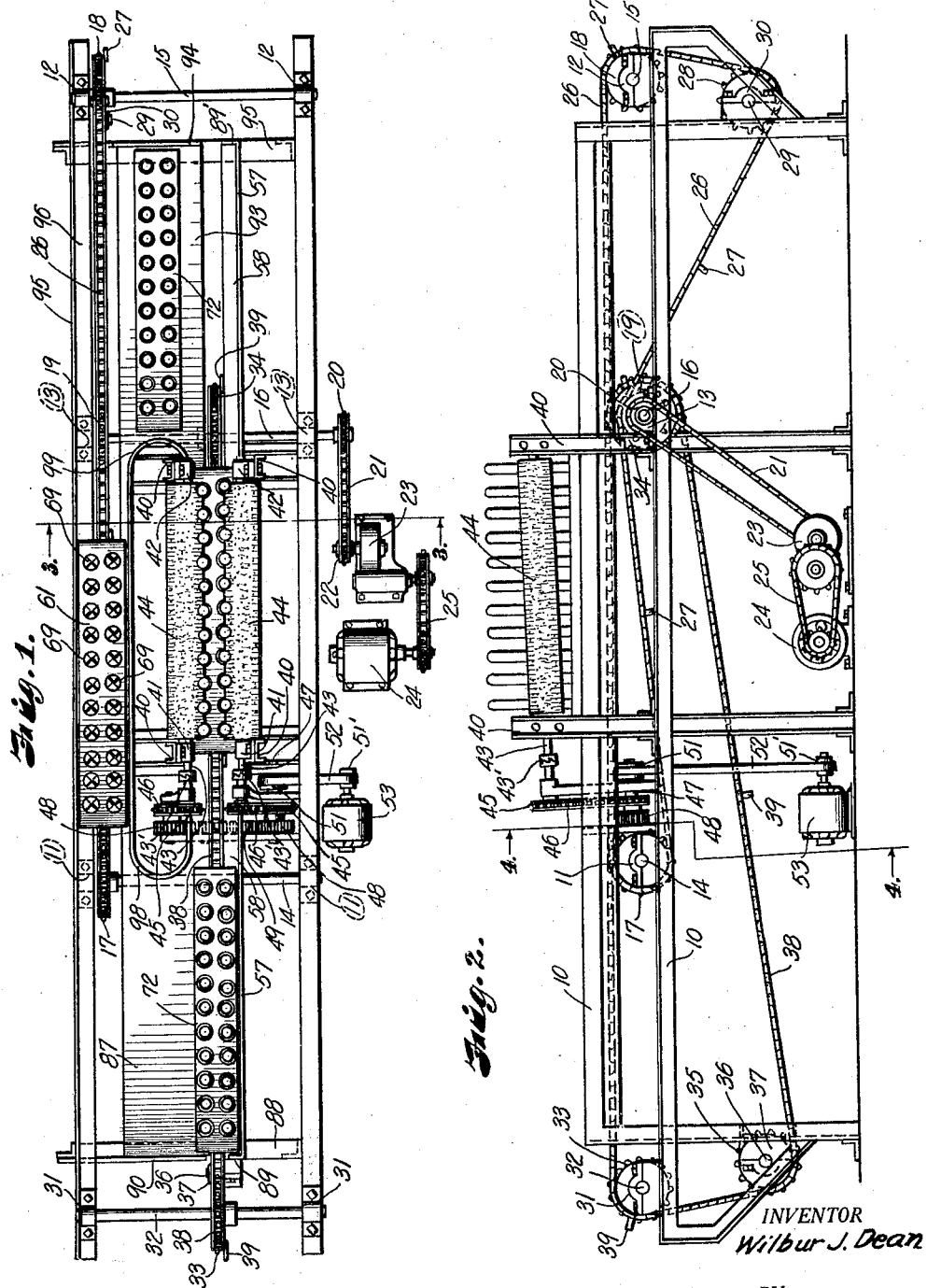
INVENTOR
Wilbur J. Dean
BY Alfred R. Fuchs
ATTORNEY March 7, 1933.  W. J. DEAN  1,899,947
BEAD FORMING MACHINE
Filed Dec. 6, 1930   2 Sheets-Sheet 2
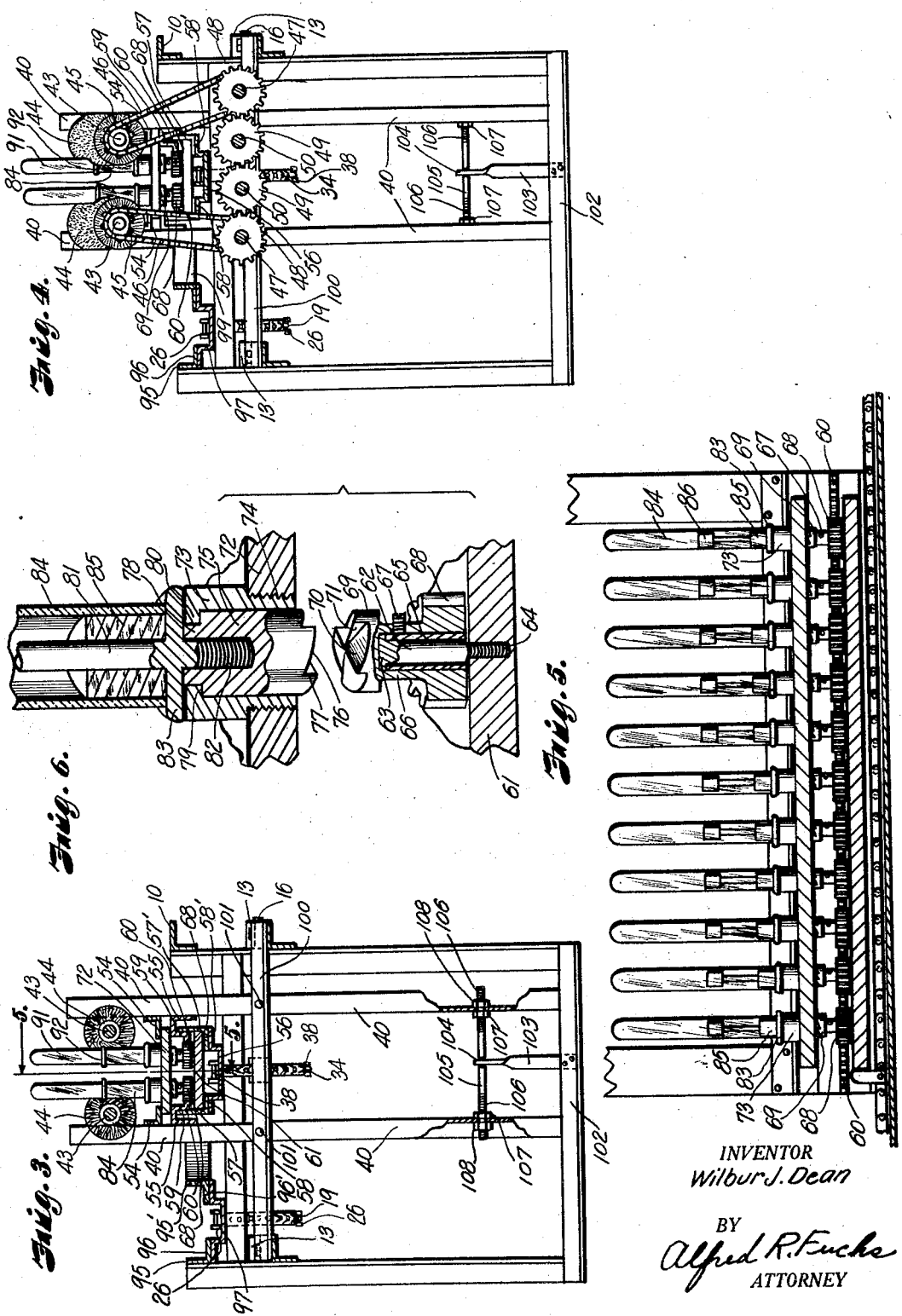
INVENTOR
Wilbur J. Dean
BY
Alfred R. Fuchs
ATTORNEY Patented Mar. 7, 1933

1,899,947

UNITED STATES PATENT OFFICE

WILBUR J. DEAN, OF KANSAS CITY, MISSOURI

BEAD FORMING MACHINE

Application filed December 6, 1930. Serial No. 500,562.

My invention relates to a machine for forming beads on thin dipped rubber articles, and more particularly to a mechanism for forming a bead on a thin rubber article while in a plastic state by rolling the thin rubber coating on the mold on itself to form the bead.

It is a purpose of my invention to provide bead forming mechanism of the character set forth above, which will form a compact bead of a uniform character on the thin dipped rubber articles automatically and without any damage to said articles. The molds, which may be of various shapes, depending upon the articles to be molded thereon, are preferably mounted on a carrier, which rotatably supports one or more rows of said molds during the various operations that are performed in the course of forming the dipped rubber articles thereon. Said carriers are also so made that the same may be carried on suitable conveyors from place to place to carry out the different steps of the process, or in any other manner that may be desired. As the articles that are molded on the molds must remain on said molds during the dipping, bead forming, and curing operations of the process, it is necessary that a large number of said molds be provided for efficiency in carrying out the process. It is furthermore necessary to provide said mechanism for rotating the molds while the bead forming means is operating on the coating of rubber thereon in a plastic state, and to provide this apparatus on the molds during the other steps of the process would unnecessarily complicate the same and make the same unnecessarily expensive and bulky.

It is, accordingly, a purpose of my invention to provide in conjunction with the bead forming apparatus, means cooperating with the mold carriers for rotating the molds on the carriers, which means is detachable from the mold carriers and is used only in conjunction therewith during the bead forming operation.

More particularly, it is a purpose of my invention to provide bead forming mechanism of the character referred to above comprising bead forming means, means for conveying the molds into cooperative relation with the bead forming means, and means for rotating said molds while in engagement with such said bead forming means comprising a member adapted to engage the conveying means, which member has means thereon to rotate said molds and on which said mold carriers are detachably mounted.

More specifically, my invention comprises a rotatable brush or brushes, which engage the thin rubber coating on the molds when brought into cooperative relation thereto, a conveyor for carrying the molds into such cooperative relation to the rotating brush or brushes, members adapted to engage said conveyor to be carried along thereby, said members comprising rotatable driving members, which are rotated due to cooperating means on said members and adjacent the conveyor and mold carriers having molds rotatably mounted thereon and provided with means cooperating with means on the driving members to rotate the molds during engagement with the brush or brushes.

Positive means for rotating the molds is preferably provided, said means comprising a rack adjacent the carrier and pinions on the rotatable driving members provided on the conveyor engaging member. The conveyor engaging members and the mold carriers are detachable from each other, and the driving means is so made that a detachable driving connection exists between each rotatable mold and the corresponding driving member on the conveyor engaging member.

It is still a further purpose of my invention to provide a machine in which supporting means is provided at opposite ends thereof for the conveyor engaging members with the rotatable brush or brushes mounted between said supports, and said machine being provided with means for conveying the conveyor engaging members with the mold carriers thereon from one of said supports into engagement with said brush or brushes to the other of said supports, and with conveyor means for returning the conveyor engaging members to the supporting means at the first mentioned end of the machine for receiving another mold carrier to convey the same into cooperative relation with the bead forming mechanism. It has been found that a very large number of mold carriers carrying a large number of molds can be utilized in the process, and engaged successively with a bead forming apparatus with the provision of only a very small number, preferably about four, conveyor engaging members upon which said mold carriers are detachably mounted.

The mold carriers are merely placed on top of the conveyor engaging members in proper relation thereto when said conveyor engaging members are moved into engagement with the conveyor to be carried toward the bead forming mechanism, and it is another purpose of my invention to provide means adjacent the conveyor for holding the mold carrying members from upward movement due to the action of the brush or brushes, and in engagement with the conveyor engaging members while the same are being carried along beside and in a generally lengthwise direction relative to the brushes.

Other objects and advantages of my invention will appear as the description of the drawings proceeds. I desire to have it understood, however, that I do not intend to limit myself to the particular details shown or described except as defined in the claims.

In the drawings:

Fig. 1 is a top plan view of my improved bead forming machine.

Fig. 2 is a side elevation thereof.

Fig. 3 is a section taken on the line 3—3 of Fig. 1.

Fig. 4 is a section taken on the line 4—4 of Fig. 1.

Fig. 5 is a vertical longitudinal sectional view with the molds in elevation, showing a portion of the bead forming machine, and the conveyor engaging member and mold carrier in the position the same will assume while in engagement with the brushes, the brushes being omitted for the sake of clearness.

Fig. 6 is a fragmentary sectional view on an enlarged scale, showing one of the driving members on the conveyor engaging member, and a portion of one of the molds with the cooperating driving means on the driving member and the mold just prior to engagement with each other.

Referring in detail to the drawings, my improved bead forming machine comprises a frame having the longitudinally extending members 10, upon which the bearings 11, 12 and 13 are mounted, which carry the shafts 14, 15 and 16 respectively. A sprocket wheel 17 is mounted on the shaft 14, a sprocket wheel 18 on the shaft 15 and a sprocket wheel 19 on the shaft 16. The shaft 16 is also provided with a sprocket 20, over which the chain 21 operates, which chain also operates over the gear 22 provided on the reduction gearing 23, which is driven from the motor 24 through the chain drive 25. A conveyor 26 in the form of a sprocket chain having the projections 27 thereon, passes over the sprockets 17, 18 and 19 in the manner shown in Fig. 2, and also passes over the sprocket 28 mounted on a short shaft 29. The conveyor 26 is thus driven from the motor 24, the bearing 30 of the shaft 29 being adjustable to place the proper tension on the conveyor 26.

Bearings 31 are provided on the longitudinal members 10 of the frame for the shaft 32, on which the sprocket 33 is mounted. A sprocket 34 is also mounted on the shaft 16, and a sprocket 35 is mounted on a stub shaft 36 mounted in the adjustable bearing 37, a conveyor 38 in the form of a sprocket chain passing over the sprockets 33, 34 and 35, the tension on said chain being adjustable by adjustment of the sprocket 35. The conveyor 38 is provided with projections 39 similar to the projections 27 on the conveyor 26. It will be noted upon reference to Fig. 1 that the conveyor 26 lies closely adjacent the one longitudinal member 10 of the frame, thus lying closely adjacent one side edge of the machine. The other conveyor 38 is located nearer the center of the machine, but nearer to the other side member 10 than the first mentioned side member 10.

It will be noted that the conveyor 38 moves in the opposite direction to the conveyor 26 on the upper run thereof due to the arrangement of the driving sprockets relative to the chains. It will also be noted that the projections 39 and 27 are located on one side of the sprocket chain conveyors 38 and 26 so as not to interfere with the engagement of the sprocket wheels with the sprocket chains on either side thereof.

The frame of the machine is provided with a pair of vertically extending members 40, which extend above the members 10 and which are provided with bearings 41 and 42 thereon. Extending through said bearings 41 and 42 are the shafts 43, which run lengthwise of the machine, but which are preferably inclined upwardly from the bearings 41 toward the bearings 42, the position of said bearings is such that the desired height of the elongated cylindrical brushes 44 provided on the shafts 43, and the inclination thereof relative to the conveyors 38 and the members 10 on the frame, to obtain the formation of the bead at the proper point and of the proper thickness on the articles that are being operated on, is obtained. The shafts 43 are provided with sprockets 45, over which the drive chains 46 operate, said drive chains 46 extending over sprockets on the shafts 47, which have the gears 48 thereon meshing with the gears 49 on the shafts 50, one of said shafts 47 being driven by means of a pulley 51, over which the belt 52 passes, which belt passes over the pulley 51' on the motor 53.

It will be seen upon reference to Fig. 4 that if the shaft 47 is driven in a clockwise direction the shaft 43 on the right side of Fig. 4 will be driven in that direction also, and the shaft 47 on the left side of Fig. 4 will be driven in a counter-clockwise direction through the gears 49, thus driving the sprocket 45 and the shaft 43 on the left side of the machine in a counter-clockwise direction. This will cause the sides of the brushes 44 that are toward each other to move upwardly, which is the desired direction for forming the beads on the articles to be operated on. A clutch 43' may be provided in each shaft 43 if desired.

The frame is further provided with a pair of longitudinally extending angular guide members 54 extending between each pair of members 40 on each side of the machine, and a similar pair of angular guide members 55 parallel to and below the members 54, the lateral flanges on the members 54 and 55 being spaced apart a uniform distance for the purpose to be described below, and extending substantially parallel to the conveyor 38 and the horizontal guide member 56 located below the brushes 44 and at a point vertically aligning with the space between said brushes 44 and serving to support the upper run of said conveyor 38 at said brushes. The guide 56 has an angular guide 57 mounted on one side thereof providing a shoulder or ledge at 58 spaced a predetermined distance from the lateral flanges 54 and 55 for a purpose to be described below, and a similar guide 57' providing a similar shoulder 58' at the other side thereof. The guide members 55 have downwardly extending portions 59 at the inner ends thereof, and racks 60 are provided on the lower ends thereof, said racks facing inwardly toward each other and toward the longitudinal center line of the conveyor 38.

My improved bead forming mechanism comprises conveyor engaging members 61, which have body portions that are substantially rectangular with plane bottom and top surfaces and straight vertical end walls, as will be evident from Fig. 1, one of said members being shown in engagement with the conveyor 26 in said figure. Mounted on the member 61 are the headed members 62, having the heads 63, and having a screw threaded portion 64 threaded into the member 61. Confined between the heads 63 and the member 61 are the sleeves 65, said sleeves 65 being freely mounted on the member 62 to rotate thereon, and having the driving members 66 secured thereto by means of the set screws 67, each driving member 66 comprising a gear or pinion 68 at one end thereof and a clutch member 69 at the other end thereof having the inclined faces 70 and the shoulders 71 to form one-half of a clutch mechanism, the other half of which is provided on the mold carrier 72, which will be described below.

The mold carriers 72 have a plurality of bearings 73 screw threaded therein, as shown at 74, the arrangement of the bearings 73 and the number thereof corresponding to the arrangement and number of the members 62 on the conveyor engaging member 61. Thus each mold carrier 72 is made of a corresponding size and shape to the conveyor engaging member 61, and has a plurality of bearings located at 73, so that when the outlines of the members 61 and 72 correspond they are in axial alignment with the bearings 62 on the member 61.

Rotatably mounted in each bearing 73 is a clutch member 75, that has a plurality of inclined faces 76 oppositely inclined to the faces 70 and cooperating therewith, and shoulders 77 engaging the shoulders 71 when the members 72 are brought into such a position over the members 61 that the clutch members 75 will engage with the clutch members 69. The clutch members 75 are provided with reduced end portions 78 providing shoulders 79, and the bearings 73 have inwardly directed flanges 80, with which said shoulders 79 engage. A retaining member 81 having a screw threaded portion 82 engaging in a threaded opening in the clutch member 75, and having a flange 83 engaging the upper end portion of the bearing 73, is provided on each of the clutch members 75. The molds 84 are mounted on the flanges 83, said molds being preferably of glass and being of any desired shape to mold the article to be formed thereon. Said molds 84 are provided with plugs 85 that may be made of cork or similar compressible material that closely engage the retaining member 81, which is made in the form of a long-rod-like member, and also closely engage the mold 84 so that each mold 84 will be held against rotation relative to the member 81, and thus held so as to rotate with the clutch member 85, with which the same is associated. In order to steady the molds 84 and retain the same in proper axial alignment with the axis of rotation of the clutch members 75 and 69, a second compressible member 86 is provided at the upper end of each member 81 fitting snugly within the mold 84, and snugly engaging the rod-like member 81.

It will be seen from the above that when a mold carrier 72 is in engagement with a conveyor engaging member 61, rotation of the gears or pinions 68 in the proper direction will rotate the molds 84 about their longitudinal axes. In operation, the conveyor engaging members 61, when mounted on the conveyor 38 are engaged by a projection 39 on the conveyor 38 that is in position to engage with the rear edge of said member 61, and will be carried from the left toward the right in Fig. 1. The position of the gears or pinions 68 on the members 61 is such that when the members 61 pass into a position adjacent the brushes 44, the racks 60 will be engaged by said pinions 68 and will rotate the same, the pinion 68 on the left of Fig. 4 being rotated in a counter-clockwise direction (looking downward on the same) and the pinion 68 at the right of Fig. 4 being rotated in a clockwise direction (looking downward on the same). Thus the longitudinal row of clutch members 69 on one side of each member 61 will be provided with shoulders 71 similar to those of the row on the opposite side of the said member 61, but facing in the opposite direction, and the clutch members 75 will correspond thereto, thus causing the rotation of the molds 84 extending along the opposite sides of said carrier in opposite directions in accordance with the rotation of the gears 68 upon engagement of the same with said racks 60.

A guide plate or support 87 is mounted on the frame of the machine with the top thereof substantially in alignment with the upper surface of the top run of the conveyor 38, and in alignment with the shoulder 58 previously referred to, the shoulder 58' being an extension of the plate 87, the member 57 on one side of said conveyor extending to the cross member 88 at the left end of the machine in Fig. 1, and having an angular end 89 thereon aligning substantially with the upstanding flange 90 on the plate 87, the flange 90 and the flange 89 acting as guides so that the members 61 may be slid crosswise off the plate 87 into position for engagement by the members 39 on the conveyor 38, the conveyor 38 running between the plate 87 and the flange 58 on the member 57. When the conveyor 38 receives the member 61, one of the mold carriers 72 is mounted thereon, the same being mounted in position preferably while the conveyor engaging member 61 is on the plate 87, the member 61, with the member 72 thereon being slid crosswise onto the conveyor 38. The conveyor 38 will, upon engagement of a member 39 with the rear edge of the member 61, carry the same and the cooperating mold carrier 72 lengthwise of said conveyor into such a position that the molds 84 will pass between the brushes 44, and into engagement with said brushes 44, which are being rotated and which are inclined upwardly at an angle such that the same will engage higher on the molds as the molds travel between the same.

The brushes 44 are so made that the bristles thereon will engage partially around the molds, as will be evident from Fig. 1, rolling the thin rubber coating 91 on said molds on itself to form the beads 92, the molds being rotated at the same time due to engagement of the gears or pinions 68 with the racks 60. The rotation of the molds simultaneously with the rotation of the brushes causes the rolling of the rubber on itself progressively around the entire mold, forming a bead of uniform size and shape around the mold at a uniform distance from the closed end of the same. After the conveyor engaging member 61 with the mold carrier 72 thereon has passed between the brushes 44, the conveyor engaging member 61 passes onto a guide plate or support 93, and remains in engagement on one side thereof with the flange 58 on the member 57, which is provided with a flange 89' corresponding with the flange 89 and aligns with a flange 94 on the plate 93. The support 93 is an extension of the plate 87, being connected therewith by the member 58'.

The flange 58 is spaced from the member 93 to provide for the passage of the conveyor 38 therebetween as the same passes over the gear 34. The conveyor engaging members 61 are thus deposited on the members 58 and 93, whereupon the same are slid laterally onto the plate 93 and the mold carriers 72 are removed therefrom. After the mold carriers 72 have been removed, the conveyor engaging members 61 are slid laterally along the member 93 into such a position that the one side thereof will engage with the upstanding flange on the guide member 95, which has a lateral flange 96, with which the members 61 will engage. The member 61 is then in position to be engaged by a projection 27 on the conveyor 26 and be carried from the right of the machine, as viewed in Fig. 1, toward the left thereof.

While the conveyor engaging member 61 is passing along on the shoulder or flange 58 on the member 57 and the shoulder or ledge 58', and confined between the members 57 and 57' below the brushes 44, the body portions of the mold carriers 72 are confined between the guides 54 and 55, which are so spaced relative to the ledges 58 and 58' that the same will hold the molds 84 from upward movement due to engagement of the brushes 44 therewith, and will hold the clutch members 75 firmly in engagement with the cooperating clutch members 69.

A guide or support 97 is provided for the upper run of the conveyor 26, and a flange or shoulder 96' and an upstanding flange 95' are provided on the machine between the supports 87 and 93, said ledge or lateral flange 96 being preferably integral with the plate 87 and the plate 93. Curved flange portions 98 and 99 may be provided on the machine adjacent the supports 87 and 93 to aid in guiding the conveyor engaging members 61 into proper position between the flanges 57 and 57' and between the flanges 96 and 96'. The conveyor engaging members 61 are engaged by one of the projections 21 on the conveyor 26, and carried along by means of the conveyor in a direction from the support 93 to the support 87, said members 61 engaging with first the flange or ledge 96 and the support 93 on opposite sides of the conveyor, then with the flanges 96 and 96' and finally with the flange 96 and the support 87 as they are carried along by the conveyor, passing out of engagement with the conveyor when the same reach a position on the support 87 adjacent the flange 96, whereupon, the same are moved laterally onto the support 87 by the operator of the machine and are in a position ready to receive a mold carrier 72 in the manner previously described.

Means is provided for adjusting the position of the brushes 44 so that the space thereof may be regulated to obtain the proper engagement of the same with the rubber coating on the molds to form the bead. In order to provide for this adjustment the four upstanding members 40 that support the bearings for the shafts 43 are pivoted to cross members 100 on the frame 101. A pair of bottom cross members 102 of the frame are each provided with a bracket 103 extending upwardly therefrom, through which a reduced portion 104 of a screw threaded rod-like member 105 extends providing shoulders closely adjacent the bracket 103 on opposite sides thereof on said member 105. There is one rod-like member for each pair of transversely aligned members 40, and these extend through openings in the members 40 and are provided with threaded portions 106 on opposite ends thereof, with which the nuts 107 and 108 engage to adjust the transverse spacing of the lower end of the members 40 in an obvious manner, thus also adjusting the spacing of the upper ends thereof due to the pivotal mounting of the same, which provides for adjustment of the axis of rotation of the brushes 44, and thus their transverse spacing.

Having thus described my invention, what I claim is:—

1. In a device of the character described, a rotatable brush, means for rotating the same, a carrier for rotatably supporting a plurality of molds, means for moving said carrier to move said molds into operative engagement with said brush comprising means for detachably supporting said carrier, a conveyor receiving said last mentioned means and cooperating means adjacent said conveyor and on said carrier supporting means for rotating said molds.

2. In a device of the character described, a frame, a rotatable brush on said frame, means for rotating said brush, a carrier for rotatably supporting a plurality of molds, means on said frame engaging said carrier to hold said molds in operative engagement with said brush as the same are moved lengthwise of the brush, and means for rotating said molds on said frame comprising a member movable with said carrier and detachably connected therewith, said member having means thereon cooperating with means on said frame to rotate said molds.

3. In a device of the character described, a conveyor, a member engaging said conveyor to be carried forward thereby, a carrier detachably mounted on said member, molds rotatably mounted on said carrier means adjacent said conveyor exerting a wiping action on said molds, and cooperating means on said member and adjacent said conveyor for rotating said molds.

4. In a device of the character described, a conveyor, a member detachably engaging said conveyor to be carried forward thereby, rotary bead forming means adjacent said conveyor, a carrier detachably mounted on said member, molds rotatably mounted on said carrier and cooperating means on said member and adjacent said conveyor, whereby the means on said member is rotated while said member is being moved by said conveyor, the means on said member being operatively connected with said molds to rotate the same.

5. In a device of the character described, a conveyor, a member detachably engaging said conveyor to be carried forward thereby, a carrier detachably mounted on said member, molds rotatably mounted on said carrier and cooperating means on said member and adjacent said conveyor, whereby the means on said member is rotated while said member is being moved by said conveyor, the means on said member being operatively connected with said molds to rotate the same, by a separable driving connection carried partially by said member and partially by said carrier, and means adjacent said conveyor operating on articles on said molds during such rotation thereof.

6. In a machine of the character described, a conveyor, a brush mounted adjacent said conveyor to rotate on an axis inclined to said conveyor and lying in a plane spaced a uniform distance from said conveyor in a direction transverse thereto, mold carrying members, a plurality of molds rotatably mounted on each of said mold carrying members and a mounting therefor comprising separable conveyor engaging members, said conveyor being mounted to receive said conveyor engaging members at a point endwise beyond the end of said brush nearest said conveyor and passing in such spaced relation to said brush as to engage said molds with said brush and carrying said members beyond the opposite end thereof, and a conveyor operating in the opposite direction to return said separable conveyor engaging members to a point beyond the first mentioned end of said brush.

7. In a machine of the character described, a rotatable brush, supports on said machine endwise beyond said brush, conveyor engaging members adapted to engage said supports, mold carriers detachably engaging therewith, a plurality of molds detachably mounted on each of said carriers, means for carrying said conveyor engaging members from one of said supports past said brush with the molds in engagement therewith to the other support, and means for returning said conveyor engaging members in the opposite direction from said last mentioned support to said first mentioned support.

8. In a machine of the character described, a rotatable brush, supports on said machine endwise beyond said brush, detachable conveyor engaging members adapted to engage said supports, mold carriers detachably engaging therewith, a plurality of molds detachably mounted on each of said carriers, a conveyor for carrying said conveyor engaging members from one of said supports past said brush with the molds in engagement therewith to the other support, and a conveyor for returning said conveyor engaging members in the opposite direction from said last mentioned support to said first mentioned support, said conveyors being spaced transversely of said machine, whereby a transverse movement of said conveyor engaging members is necessary to engage the same with either of said conveyors after delivery by the other thereof.

9. In a machine of the character described, bead forming means, molds and means for operatively engaging said molds with said bead forming means comprising a conveyor, a conveyor engaging base member and a mold carrier detachably mounted on said base member and provided with means for rotatably supporting said molds.

10. In a machine of the character described, bead forming means, molds and means for operatively engaging said molds with said bead forming means and rotating said molds comprising a conveyor, a conveyor engaging base member having rotatable driving members thereon cooperating means on said base member and adjacent said conveyor to rotate the same during engagement of said molds with said bead forming means, and a detachable mold carrier mounted on said base member provided with means for rotatably supporting said molds and driving connections between said driving members and said means for rotatably supporting said molds.

11. In a machine of the character described, bead forming means, molds, and means for operatively engaging said molds with said bead forming means and rotating said molds during such engagement, comprising a rack, a conveyor extending alongside said rack, a conveyor engaging base member detachably mounted on said conveyor, driving members on said base member, gears on said driving members engaging said rack to rotate said driving members, a mold carrier having said molds rotatably mounted thereon and driving connections to rotate said molds with said driving members.

12. In a machine of the character described, bead forming means, molds, and means for operatively engaging said molds with said bead forming means and rotating said molds during such engagement, comprising a rack, a conveyor extending alongside said rack, a conveyor engaging base member detachably mounted on said conveyor, driving members on said base member, gears on said driving members engaging said rack to rotate said driving members, a mold carrier having said molds rotatably mounted thereon, clutch members on said driving members and cooperating clutch members on said molds engaging the clutch members on said driving members to rotate said molds upon rotation of said driving members.

13. In a machine of the character described, bead forming means, molds, and means for operatively engaging said molds with said bead forming means and rotating said molds during such engagement, comprising a rack, a conveyor extending alongside said rack, a conveyor engaging base member detachably mounted on said conveyor, driving members on said base member, gears on said driving members engaging said rack to rotate said driving members, a mold carrier having said molds rotatably mounted thereon, clutch members on said driving members, cooperating clutch members on said molds engaging the clutch members on said driving members to rotate said molds upon rotation of said driving members and means adjacent said conveyor engaging said mold carrier to hold said clutch members in engagement.

14. In apparatus of the character described, a member having a base thereon, bearings on said base, clutch members mounted on said bearings, gears on said clutch members, a member having a base thereon detachably mounted on said first member, molds rotatably mounted thereon, clutch members carried by said molds and adapted to engage said first mentioned clutch members when said second mentioned member is mounted on said first mentioned member to rotate said molds upon rotation of said gears.

In testimony whereof, I hereunto subscribe my name this 14th day of November, 1930.

WILBUR J. DEAN.